United States Patent [19]

Karubian et al.

[11] 4,446,599
[45] May 8, 1984

[54] STUNNING GUN WITH IMPROVED CONTROL VALVE

[75] Inventors: Ralph K. Karubian; Gregorio J. Coelho, both of Los Angeles, Calif.

[73] Assignee: Kentmaster Mfg. Co., Inc., Los Angeles, Calif.

[21] Appl. No.: 532,691

[22] Filed: Sep. 16, 1983

[51] Int. Cl.³ .............................................. A22B 3/02
[52] U.S. Cl. ................................................. 17/1 B
[58] Field of Search ................................... 17/1 B, 1 R

[56] References Cited

U.S. PATENT DOCUMENTS 910,775  1/1909  Bergh .................................... 17/1 B
4,219,905  9/1980  Thacker et al. ....................... 17/1 B Primary Examiner—Willie G. Abercrombie
Attorney, Agent, or Firm—Bruce L. Birchard

[57] ABSTRACT

A stunning gun having a relatively massive cylindrical piston with annular recesses, such piston forming a slip fit with its containing cylinder and riding on an air bearing, is provided with a springless valving system which relies on differential air pressures to keep the valves closed and permits a massive air influx into the containing cylinder when one of the sources of air pressure acting on one of the valves is cut off by the manual opening of another valve in the system.

10 Claims, 3 Drawing Figures

STUNNING GUN WITH IMPROVED CONTROL VALVE

SPECIFICATION

RELATED CO-PENDING APPLICATION

This application is related to but constitutes an improvement over U.S. patent application Ser. No. 06/517,003, filed July 25, 1983, entitled Improved Stunning Gun and assigned to the same assignee as this application.

BACKGROUND OF THE INVENTION

1. Field of the Invention

This invention relates to animal-stunning tools for use in slaughter houses.

2. Prior Art

Slaughter house techniques have varied over the ages from the crudeness of a sledge-hammer to the sophistication of electrical-shock equipment. The object of all of this equipment is to cause unconciousness in the animal during slaughter but not causing the cessation of the pumping action of the heart. The flow of blood through the animal is important to the quality of the meat obtained from the animal.

A search of the Patent Office records has revealed U.S. Pat. No. 4,219,905 (Thacker) which is related to but not anticipative of my invention. In the Thacker patent a piston of low mass and carrying a lowmass needle is moved forward by a blast of compressed air released through a complex combination of valves. Because of the low mass of the piston and needle, the penetrating power of the combination is limited. The combination of valves incorporated in Thacker is expensive, complex, and subject to malfunctioning. Further, the O-rings and seals in Thacker's device cause friction during operation of the piston and are also subject to wear and failure under the air pressure which must be used.

Therefore, it is the general object of this invention to provide an animal stunning gun which is free from the problems associated with prior art devices.

It is further object of this invention to provide a low-cost, highly effective stunning gun with a minimum number of parts and minimal operational problems.

SUMMARY OF THE INVENTION

By providing in a stunning gun having a relatively massive cylindrical piston with annular recesses in its outer surface, such piston having a diameter such that it forms a slip fit with its containing cylinder and rides on an air bearing, a springless valving system which relies on differential air pressures to keep the valves closed and permits a massive air flow when one of the sources of air pressure acting on one of the valves in the system is cut off by the manual opening of another one of the valves in the system, a compressed-air stunning gun with maximum simplicity and effectiveness is realized.

BRIEF DESCRIPTION OF THE DRAWINGS

Those and other features of my invention will be understood from the description which follows taken in connection with the accompanying drawings in which.

DETAILED DESCRIPTION OF THE PREFERRED EMBODIMENT

Figure 1:
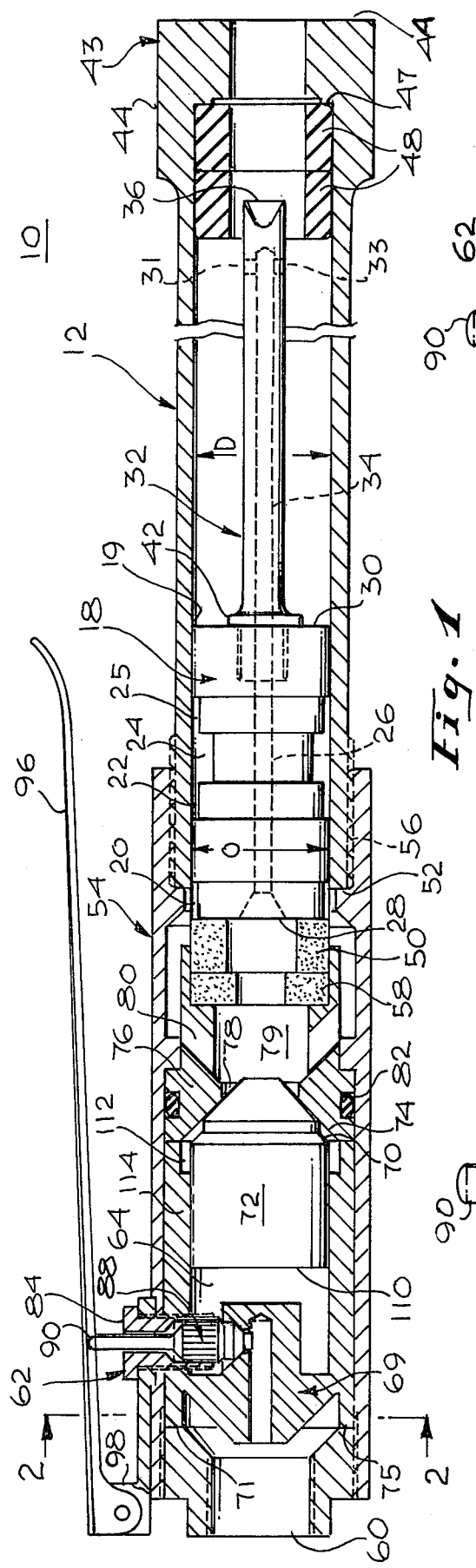
FIG. 1 is a partially cross-sectioned view of an animal stunning gun according to my invention.

In FIG. 1, stunning gun 10 includes cylindrical, hollow barrel 12 having an inside-diameter "D". A cylindrical piston 18, of stainless steel, conventional steel or other material, having an outer-diameter "O" such that a slip-fit exists between piston 18 and the inner wall 19 of diameter "D" in barrel 12, is designed to move within barrel 12 without releasing air around its outer extremity. Piston 18 has annular recesses 20, 22, 24 and 25 which reduce surface friction between inner wall 19 and piston 18 without significantly reducing the mass of piston 18. A coaxial air passage 26 extends from end 28 of piston 18 to opposite end 30 thereof. The air passage 26 is enlarged at end 30 and internally threaded to permit insertion and retention of bolt or probe 32 therein. Probe 32 has an air passage 34 coaxially therethrough aligned with air passage 26 in piston 18. Annular stop 42 is provided on probe 32 to firmly seat probe 32 in piston 18. Piston 18 and probe 32 may be made of stainless steel to minimize corrosion and contamination. Probe 32, which must be very hard and cannot be made of stainless steel, terminates at its exposed end 36 in a concavity of conical shape. This concentrates penetrating forces in a sharp edge on end 36, enhancing the penetrating powers of probe 32. Air in front of piston 18 as it moves probe 32 into the animal's skull is exhausted through ports 31, 33.

Barrel 12 terminates at one end 43 in an enlarged portion 44 which may be part of barrel 12. A rubber or other shock-absorbing cushions 48, or a coil spring, is held in enlarged portion 44 by means of shoulder 47. A ring of magnetic material or a ceramic magnet, itself, 50 is secured in piston 18 near end 28.

The opposite end 52 of barrel 12 carries handle 54 by means of threads 56, for example.

Figure 2:
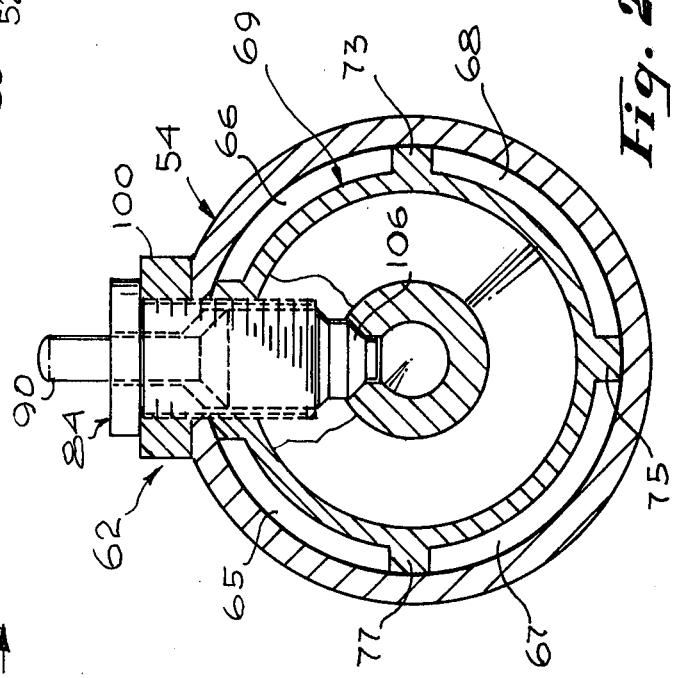
FIG. 2 is a sectional view taken along the line 2—2 in FIG. 1.

Handle 54 contains therein retaining ring magnet 58 polarized to attract and cooperate with ring 50, assuming ring 50 is a magnet. Handle 54 further contains compressed air inlet aperture 60 which selectively communicates through actuating or control valve assembly 62 with intermediate chamber 64, and continuously communicates, through longitudinal and concentrically disposed channels 65, 66, 67 and 68 (FIG. 2) of insert 69 with annular surface 70 on main spool 72, urging spool 72 out of engagement with valving surface 74 of porting element 76. Insert 69 is supported coaxially in handle 54 by longitudinal, angularly spaced, ribs 71, 73, 75, 77 (FIGS. 1 and 2).

Porting element 76 has a coaxially disposed opening 78 and peripherally disposed, but spaced openings, 80, communicating through openings in magnetic ring 50, with end 28 of piston 18. Porting element 76 carries "O"-ring 82 to prevent air leakage thereby.

Figure 3:
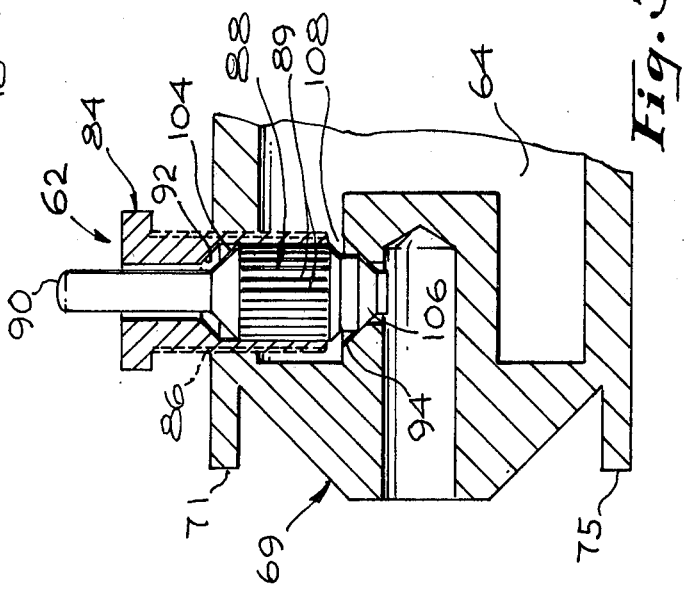
FIG. 3 is an elevational view, partially in section, of a portion of the valving system of FIG. 1.

Activating-valve-assembly 62 includes plug 84 which is secured in insert 69 by means of threaded region 86. In addition, control spool 88 with its actuator rod 90 is guided but is free to move along its axis between the inner-upper conically-shaped surface 92 of plug 62 and the lower stepped-conical surface 94 of insert 69. The configuration of control spool 88 can be seen more clearly in FIG. 3.

Actuator rod 90 is engaged by trigger 96 which is pivotally supported on bracket 98, which, in turn, is secured to handle 54 by shoulder 100 on plug 62.

When a source of air or other compressible fluid under pressure is connected to inlet 60, the initial surge of air causes control spool 88 to move to its upper limit, at which point the upper conical surface 104 of control spool 88 engages inner-upper surface 92 of plug 62 and prevents any flow of air around spool 88 and actuator rod 90, to the atmosphere. However, the lower conical surface 106 of spool 88 then is no longer seated on inner-lower surface 94 of insert 69. As a result, air or other activating fluid may flow freely around spool 88 and thru opening 108 into intermediate chamber 64, thereby putting full source pressure on face 110 of main spool 7, urging it with considerable force towards valving surface 74 of porting element 76 and preventing the flow of air into outlet chamber 79. At the same time, however, there is a lesser but significant counter-force caused by pressure on annular surface 70 as a result of air flowing through longitudinal channels 65, 66, 67 and 68, and openings 112 caused by a fore-shortening of the body portion 114 of insert 69 between ribs 71, 73, 75, 77 (FIG. 2). This counter-force is small compared to the main force acting on surface 110 of spool 72, because of the significant difference in areas of surfaces 110 and 70. But that counterforce becomes significant, as will be explained hereinafter.

Upon depression of trigger 84, with piston 18 in a retracted position, air under pressure behind surface 110 of main spool 72 is vented, through depressions or serrations 89 in control spool 88, to the atmosphere and the entry of further air to intermediate chamber 64 is cut off by the engagement between surface 106 of spool 88 and lower-inner surface 94 of insert 69. Thus, all pressure urging main spool 72 into closing engagement with surface 74 of porting element 76 is removed. At the same moment, however, the reverse pressure on annular surface 70 urging spool 72 out of engagement with surface 74 remains and forces spool 72 into the "valve-open" position. The air, under pressure, from inlet 60 is applied, with full force, thru openings 78 and 80 and thru magnet 50 to end 28 of piston 18, propelling it forward with great speed and force. Probe 32 penetrates the skull of the animal and enters its brain. Compressed air is injected through openings 31, 33 into the brain cavity thus causing the animal to become comatose, although the heart pumping action continues in the animal. The rebound action produced by the cushions 48 assists the removal of the probe 32 from the skull. The gun is then re-cocked by holding it with probe 32 upright, causing probe 32 to retract into a position with magnetic material 50 in contact with ring magnet 58.

It should be noted that magnet 58 may be an electromagnet. The flux field of magnet 58 is made such that ring 50 and piston 18 are retained in the retracted position until the pressure on piston 18 becomes high so that piston 18 is released in impulse fashion and achieves its operating speed rapidly. Further, the length of barrel 12 is made longer than the combined lengths of piston 18 and the exposed portion of probe 32 so that the combination of piston and probe will achieve a significant forward momentum before probe or bolt 32 strikes the skull of the animal being stunned.

Piston 18 rides on an air bearing produced by the impulse of air applied to its surface 28. No O-rings are required to prevent pressure loss because the surge of air produced when control valve 88 is actuated is so great as to form an air barrier at the outer periphery of surface 28.

Thus, it can be seen that there has been provided a stunning gun which is simple in construction, is subject to little failure in operation and is effective in its performance.

While particular embodiments have been shown and described, it will be apparent to one skilled in the art that variations and modifications thereof may be made without departing from the spirit and scope of my invention. It is the purpose of the appended claims to cover all such variations and modifications.

I claim:

1. A stunning gun having:
   a barrel with an inner wall having a first inside diameter and with first and second ends;
   a piston having a first maximum outside diameter supported coaxially within said barrel for movement therein;
   said first maximum outside diameter having a magnitude such that said piston forms a slip fit with said first inside diameter of said inner wall of said barrel;
   a probe fixedly and coaxially supported at the end of said piston corresponding to said second end of said barrel and moveable with said piston;
   said piston and said probe each having intercommunicating air passages therethrough;
   said air passage in said probe having a coaxial portion and a communicating exhaust portion at right angles thereto;
   said piston having annular recesses in the outer surface thereof and carrying on its end corresponding to said first end of said barrel a region of magnetic material;
   a handle portion carried by said barrel at said first end thereof and having an air inlet aperture;
   an insert carried coaxially within said handle portion and having an inlet port communicating with said air inlet aperture of said handle portion and having an intermediate chamber with a cylindrical inner wall having a first diameter;
   control valve means carried in said insert for selectively coupling said air inlet port to said intermediate chamber;
   a main valve spool having a cylindrical body portion with an axis which is coaxial with said intermediate chamber and having an outer diameter such that it forms a slip fit with said cylindrical inner wall of said cylindrical inner wall of said insert, said main spool having a flat end facing said control valve means, the opposite end of said main spool having a tapered portion;
   an annular-groove portion coupling said tapered portion of said main spool to said cylindrical body portion thereof;
   said annular-groove portion having a pressure surface the generating element for which is other than parallel with the axis of said cylindrical body of said main spool;
   a porting element caused coaxially in said handle adjacent said insert portion at the end thereof carrying said main valve spool and having an entrance-opening tapered to cooperate with said tapered portion of said main valve spool, said porting element having an output chamber therein communicating with said entrance opening and with said barrel for passing air to said barrel, under the control of said control valve, to activate mid piston;
   said control valve including means responsive to the application of compressed air to said air inlet aperture to open said control valve, whereby air may flow from said air inlet aperture, through said intermediate chamber to said flat end of said main valve spool to urge said main valve spool towards said porting element and said tapered portion of said main valve spool into engagement with said tapered entrance-opening of said porting element with a force greater than that produced in the opposite direction by compressed air operating upon said pressure surface of said annular-groove portion of said main valve spool;

said control valve further including means responsive to selective activation of said control valve in the presence of compressed air applied to said air inlet aperture to close said control valve, whereby air flow through said intermediate chamber to said flat end of said main valve spool is cut off and said tapered end of said main valve spool is urged out of engagement with said tapered entrance opening of said porting element and the flow of air from said air inlet aperture to said piston is unimpeded; and, means for selectively activating said control valve.

2. Apparatus according to claim 1 in which said means for selectively activating said control valve is a trigger pivotally supported from said handle portion.

3. Apparatus according to claim 1 in which said control valve includes a control spool having indentations extending the length thereof and spaced about said control spool.

4. Apparatus according to claim 1 in which said control valve includes a control spool having a first length and having upper and lower shoulders and a plug having an interior chamber for receiving said control spool, said interior chamber having an upper interior valving surface, said insert having an aligned lower interior valving surface spaced from said upper interior valving surface by a distance greater than said first length of said control spool, each of said interior valving surfaces being shaped to form a barrier to the passage of air when engaged by its respective shoulder on said control spool.

5. Apparatus according to claim 1 which includes, in addition, piston-retaining means carried within said handle adjacent said first end of said barrel for releasably retaining said piston in a position adjacent said first end of said barrel prior to the firing of said gun.

6. Apparatus according to claim 5 in which said piston-retaining means conprises a first ring magnet carried within said handle and positioned to cooperate with an attractively-poled ring magnet carried by said piston at the end thereof adjacent, in the retracted position of said piston, said first end of said barrel.

7. Apparatus according to claim 1 including, in addition, stop means positioned adjacent said second end of said barrel for limiting the travel of said piston.

8. Apparatus according to claim 7 in which said stop means includes a rubber ring.

9. Apparatus according to claim 1 in which said probe has first and second ends, said second end being remote from said piston and having a conically-shaped recess therein.

10. Apparatus according to claim 1 in which the length of said barrel exceeds the combined lengths of said piston and said probe, with said probe in place in said piston.

* * * * *